US011990606B2

(12) United States Patent
Uchiyama et al.

(10) Patent No.: US 11,990,606 B2
(45) Date of Patent: *May 21, 2024

(54) NEGATIVE ELECTRODE ACTIVE MATERIAL FOR NON-AQUEOUS ELECTROLYTE SECONDARY BATTERIES

(71) Applicant: Panasonic Intellectual Property Management Co., Ltd., Osaka (JP)

(72) Inventors: Yohei Uchiyama, Hyogo (JP); Norihisa Yamamoto, Osaka (JP); Tatsuya Akira, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 414 days.

This patent is subject to a terminal disclaimer.

(21) Appl. No.: 16/957,156

(22) PCT Filed: Oct. 29, 2018

(86) PCT No.: PCT/JP2018/040024
§ 371 (c)(1),
(2) Date: Jun. 23, 2020

(87) PCT Pub. No.: WO2019/130787
PCT Pub. Date: Jul. 4, 2019

(65) Prior Publication Data
US 2020/0350563 A1    Nov. 5, 2020

(30) Foreign Application Priority Data

Dec. 28, 2017 (JP) .................... 2017-254952

(51) Int. Cl.
*H01M 4/36* (2006.01)
*H01M 4/02* (2006.01)
(Continued)

(52) U.S. Cl.
CPC ............. *H01M 4/362* (2013.01); *H01M 4/38* (2013.01); *H01M 4/5825* (2013.01); *H01M 10/0525* (2013.01); *H01M 2004/027* (2013.01)

(58) Field of Classification Search
CPC ...... H01M 4/362; H01M 4/38; H01M 4/5825; H01M 10/0525; H01M 2004/027
See application file for complete search history.

(56) References Cited

U.S. PATENT DOCUMENTS

2014/0332718 A1* 11/2014 Kojima ................. H01M 4/525
                                                            252/182.1
2014/0370378 A1* 12/2014 Liu ..................... H01M 4/1395
                                                            427/213.36
(Continued)

FOREIGN PATENT DOCUMENTS

CN          107408682 A      11/2017
JP          2011-76793 A      4/2011
(Continued)

OTHER PUBLICATIONS

Zhou et al. (Electrochemistry Communications 6 (2004) 1144-1148) (Year: 2004).*

(Continued)

*Primary Examiner* — Brian R Ohara
*Assistant Examiner* — Emily Elizabeth Freeman
(74) *Attorney, Agent, or Firm* — WHDA, LLP

(57) ABSTRACT

A negative electrode active material for non-aqueous electrolyte secondary batteries, including: lithium silicate composite particles including a lithium silicate phase and silicon particles dispersed in the lithium silicate phase, the lithium silicate phase being an oxide phase including Li, Si, O, and M, where M is an element other than the following elements: Group 1 elements of alkali metals, Group 16 elements of oxygen group, Group 18 elements of rare gas, and Si. An amount of each element relative to a total amount of Li, Si (Continued)

and M in the lithium silicate phase is 3 to 55 mol % for Li, 25 mol % or more for Si, and 3 to 50 mol % for M. A carbon material is present inside the lithium silicate composite particles; and an area ratio of the carbon material occupying a cross section of the composite particles is 0.008 to 6%.

12 Claims, 2 Drawing Sheets

(51) Int. Cl.
  *H01M 4/38* (2006.01)
  *H01M 4/58* (2010.01)
  *H01M 10/0525* (2010.01)

(56) References Cited

U.S. PATENT DOCUMENTS

| | | |
|---|---|---|
| 2017/0149050 A1 | 5/2017 | Hirose et al. |
| 2017/0309950 A1 | 10/2017 | Minami et al. |
| 2018/0342757 A1 * | 11/2018 | Choi ............... H01M 4/583 |

FOREIGN PATENT DOCUMENTS

| | | | |
|---|---|---|---|
| JP | 2013-125648 A | | 6/2013 |
| JP | 2013125648 A | * | 6/2013 |
| JP | 2014-80319 A | | 5/2014 |
| JP | 2014-82219 A | | 5/2014 |
| JP | 2014-107013 A | | 6/2014 |
| JP | 2015-153520 A | | 8/2015 |
| WO | 2015/198511 A1 | | 12/2015 |
| WO | WO-2016121325 A1 * | 8/2016 | ............ B24B 49/00 |

OTHER PUBLICATIONS

International Search Report dated Jan. 29, 2019, issued in counterpart Application No. PCT/JP2018/040024. (2 pages).

English Translation of Chinese Search Report dated Aug. 24, 2022, issued in counterpart CN Application No. 201880074612.1. (2 pages).

* cited by examiner

NEGATIVE ELECTRODE ACTIVE MATERIAL FOR NON-AQUEOUS ELECTROLYTE SECONDARY BATTERIES

TECHNICAL FIELD

The present invention mainly relates to an improvement of a negative electrode active material for non-aqueous electrolyte secondary batteries.

BACKGROUND ART

In recent years, there has been a growing expectation for non-aqueous electrolyte secondary batteries having a high voltage and a high energy density, as a promising power source for small consumer applications, power storage devices, and electric vehicles. With increasing demand for a higher battery energy density, a material containing silicon (Si) that forms an alloy with lithium has been expected to be utilized as a negative electrode active material having a high theoretical capacity density.

A material containing silicon, however, has a large irreversible capacity, and thus is inferior in initial charge-discharge efficiency (esp., ratio of first discharge capacity to first charge capacity). To address this, various techniques have been proposed for introducing lithium in an amount corresponding to the irreversible capacity in advance, into a material containing silicon. Specifically, one proposal suggests using composite particles including a lithium silicate phase and silicon particles dispersed in the lithium silicate phase (Patent Literature 1). The silicon particles contribute to charge and discharge reactions (reversible absorption and release of lithium).

CITATION LIST

Patent Literature

[PTL 1] Japanese Laid-Open Patent Publication No. 2015-153520

SUMMARY OF INVENTION

It has been known that the silicon particles expand and contract considerably in association with absorption and release of lithium, during charge and discharge. As the silicon particles expand and contract, a large stress is generated in the lithium silicate phase present around the silicon particles, causing cracks or breaks in the composite particles. In association with this, the bonding force between the composite particles and a binder therearound is weakened, and especially when broken, the composite particle loses a path that allows for electrical communication with the neighboring particles, and becomes isolated. This deteriorates the charge-discharge cycle characteristics.

In view of the above, one aspect of the present invention relates to a negative electrode active material for non-aqueous electrolyte secondary batteries, including: lithium silicate composite particles including a lithium silicate phase and silicon particles dispersed in the lithium silicate phase, the lithium silicate phase being an oxide phase including Li, Si, O, and M, where M is an element other than the following elements: Group 1 elements of alkali metals, Group 16 elements of oxygen group, Group 18 elements of rare gas, and Si, wherein an amount of each element relative to a total amount of Li, Si and M in the lithium silicate phase is 3 to 55 mol % for Li, 25 mol % or more for Si, and 3 to 50 mol % for M; a carbon material is present inside the lithium silicate composite particles; and an area ratio of the carbon material occupying a cross section of the composite particles is 0.008 to 6%.

With the negative electrode active material of the present invention, a non-aqueous electrolyte secondary battery having excellent charge-discharge cycle characteristics can be provided.

DESCRIPTION OF EMBODIMENTS

Figure 1:
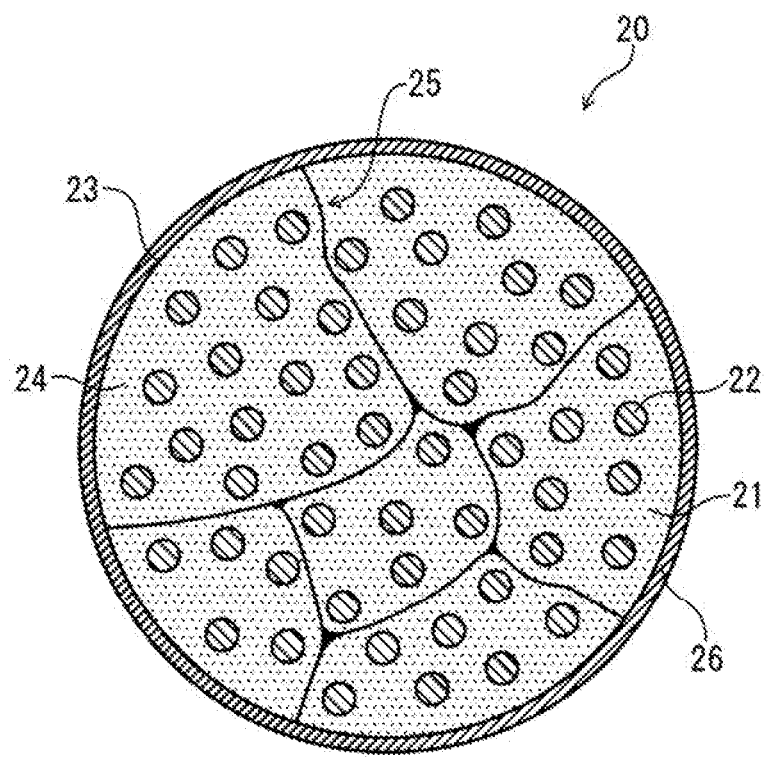
FIG. 1 A schematic cross-sectional view of a negative electrode active material according to an embodiment of the present invention.

A negative electrode active material for non-aqueous electrolyte secondary batteries according to an embodiment of the present invention includes lithium silicate composite particles (hereinafter sometimes referred to as LSX particles) including a lithium silicate phase and silicon particles dispersed in the lithium silicate phase. To put it differently, the LSX particles have a lithium silicate phase corresponding to the sea part of a sea-island structure, and silicon particles corresponding to the island parts. The lithium silicate phase is an oxide phase including Li, Si, O, and M (where M is an element other than Group 1 elements of alkali metals, Group 16 elements of oxygen group, Group 18 elements of rare gas, and Si). An amount of each element relative to a total amount of Li, Si and M in the lithium silicate phase is 3 to 55 mol % (preferably 10 to 40 mol %) for Li, 25 mol % or more (preferably 40 to 70 mol %) for Si, and 3 to 50 mol % (preferably 5 to 30 mol %) for M. M may be one element or a combination of two or more elements.

The lithium silicate phase is present in the form of an oxide phase containing M in an amorphous state, a crystalline state or an amorphous-crystalline mixed state. M is incorporated in the lithium silicate, and, for example, not isolated in the form of an oxide of M alone (e.g., MO, $MO_2$, $M_3O_3$). The amount of Li in the lithium silicate phase containing M is probably lower than that in the lithium silicate phase only composed of Li, Si and O (e.g., $Li_2Si_2O_5$). In this case, with the ion conductivity maintained, the hardness (e.g., Vickers hardness) of the sea part of the sea-island structure can be increased. The increased hardness of the lithium silicate phase of the sea part can reduce the collapse of the lithium silicate phase, when forming a composite of hard silicon panicles and the lithium silicate phase. As a result, the silicon particles can be pulverized more finely. Therefore, the expansion and contraction of Si associated with charge-discharge cycles can be suppressed.

In view of increasing the hardness of the lithium silicate phase sufficiently, a ratio of Li to Si in the lithium silicate phase satisfies preferably 0<Li/Si<1, more preferably 0<Li/Si≤0.7, in terms of a molar ratio.

Preferable examples of M include Group 2 elements, Group 13 elements, and transition elements. For example, M may be at least one selected from the group consisting of Ca, Mg, B, Al, Zr, Nb, Ta, La, V, Y, Ti, P, and W. Specifically, for example, B, which lowers melting point, acts to enhance the flowability during sintering, and thereby to improve the sinterability and increase the hardness. Ca acts to increase the hardness, although reducing the ion conductivity. Al, Zr, Nb, Ta and La act to increase the hardness, while maintaining the ion conductivity.

Next, a carbon material is present inside the LSX particles. An area ratio of the carbon material occupying a cross section of the LSX particles is 0.008 to 6%. The presence of the carbon material in a specific ratio in the lithium silicate phase can suppress the reduction in ion conductivity of the LSX particles, as well as can reduce the stress generated in the lithium silicate phase due to expansion and contraction of the silicon particles during charge and discharge. In addition to the increased hardness of the lithium silicate phase, the generation of less stress during repeated charge and discharge can effectively serve to suppress the occurrence of cracks and breaks in the composite particles. As a result, the charge-discharge cycle characteristics can be improved.

When the area ratio of the carbon material occupying a cross section of the LSX particles is less than 0.008%, the occurrence of cracks and breaks in the LSX particles is difficult to be suppressed, and the charge-discharge cycle characteristics deteriorate. When the area ratio of the carbon material occupying a cross section of the LSX particles exceeds 6%, the presence ratio of the silicon particles that contribute to the charge and discharge is reduced, and the battery capacity decreases. In order to further enhance the battery capacity and the charge-discharge cycle characteristics, the area ratio of the carbon material occupying a cross section of the composite particles is preferably 0.05 to 6%, more preferably 1 to 3%.

The carbon material may be present within the lithium silicate phase or between the lithium silicate phase and the silicon particles. The carbon material may be distributed in dots or linearly on a cross section of the LSX particles.

More specifically, the carbon material is preferably present, inside a secondary particle of the lithium silicate phase formed of a plurality of primary particles aggregated together including the lithium silicate phase and the silicon particles, at at least part of an interface between the primary particles adjacent to each other.

The amount of each element in the lithium silicate phase is determined, for example, by the following method. First, a sample of the lithium silicate phase is allowed to entirely dissolve in a heated acid solution (mixed acid of hydrofluoric acid, nitric acid and sulfuric acid), followed by filtering to remove the undissolved carbon residue. Thereafter, the obtained filtrate is analyzed by inductively coupled plasma atomic emission spectroscopy (ICP-AES), to measure a spectral intensity of each metal element. Subsequently, calibration curves are prepared using commercially available standard solutions of metal elements, and the amount of each metal element in the lithium silicate phase is calculated. With respect to silicon and boron, the sample is dissolved with sodium carbonate, and the amount of each element is measured similarly to the above after filtration.

The lithium silicate phase has a Vickers hardness of preferably 600 Hv or more, more preferably 650 Hv or more, still more preferably 700 Hv or more. The Vickers hardness can be measured as follows. The lithium silicate phase is embedded in a thermosetting resin, followed by polishing with #400 polishing paper, to expose a cross section of the LSX particles. This is further followed by buff-polishing with #2000 polishing paper, to give a mirror finish on the cross section. Note that the lithium silicate phase has a possibility of dissolving in water, and therefore, polishing is performed without using water. The cross section after polishing is measured for the Vickers hardness under the conditions of a load of 1 kg and a load holding time of 15 sec, using a Vickers hardness tester.

The lithium silicate phase is poor in electron conductivity, and thus the LSX particles also tend to be low in electrical conductivity. However, by covering the secondary particles of the lithium silicate phase formed of a plurality of primary particles aggregated together, with an electrically conductive material to form a conductive layer, the electrical conductivity of the LSX particles can be considerably enhanced. The conductive material is preferably a carbon material.

When the LSX particles include an electrically conductive material covering at least part of the surface of the secondary particles, the carbon material present inside the LSX particles may be in contact with the conductive layer. In this case, the carbon material present inside the LSX particles is, on a cross section thereof preferably extending linearly from the interior toward the surface of the secondary particles along the interface between the primary particles adjacent to each other. An end of the linearly extending carbon material on the surface side of the secondary particles is preferably in contact with the conductive material.

The conductive layer formed on the surface of the LSX particles with coating of an electrically conductive material is preferably thin enough not to substantially influence the average diameter of the LSX particles. The conductive layer has a thickness of preferably 1 to 200 nm, more preferably 5 to 100 nm, for securing the electrical conductivity and allowing for diffusion of lithium ions. The thickness of the conductive layer can be measured by cross-section observation of the particles using a SEM or TEM.

The area ratio of the carbon material occupying a cross section of the LSX particles can be determined, for example, as follows. First, the battery is disassembled, to take out the negative electrode, which is then polished with a cross section polisher (CP), to obtain a cross section of the negative electrode mixture layer. The cross section of the negative electrode mixture layer is observed under a scanning electron microscope (SEM). From a cross-sectional image in backscattered electron mode of the negative electrode mixture layer, 10 LSX particles having a maximum diameter of 5 μm or more are randomly selected, which are then each subjected to a carbon mapping analysis by an energy dispersive X-ray (EDX). An analysis software is used to calculate a carbon-containing area in the image. The magnification for observation is preferably 2,000× to 20,000×. The obtained measured values of the carbon-containing areas of the 10 particles are averaged.

It is to be noted that a film that coats the LSX particles may be formed in the course of charge and discharge due to, for example, the decomposition of the electrolyte. In addition, as described later, the LSX particles sometimes further include an electrically conductive layer covering the surface of the composite particles. With these taken into account, the EDX mapping analysis is performed within 1 μm inward from the peripheral edge of the cross section of the LSX particles, so that neither the thin coating film nor the conductive layer enters the measurement area. By the EDX mapping analysis, the distributed state of the carbon material inside the LSX particles can also be checked. The measurement is preferably performed on a sample taken before or early in charge-discharge cycles because, late in the cycles, it becomes difficult to make a distinction from an electrolyte decomposition product.

The carbon material preferably contains at least one selected from the group consisting of a carbon compound and a carbonaceous material. Preferred is a carbonaceous material. Examples of the carbon compound include a compound containing carbon and hydrogen, and a compound containing carbon, hydrogen, and oxygen.

Examples of the carbonaceous material include an amorphous carbon having low crystallinity, such as carbon black, coal, coke, charcoal, and activated carbon, and graphite having high crystallinity. Preferred is an amorphous carbon in terms of its low hardness and excellent buffering effect against the silicon particles whose volume changes during charge and discharge. The amorphous carbon may be graphitizable carbon (soft carbon) or non-graphitizable carbon (hard carbon). Examples of the carbon black include acetylene black and Ketjen black. The graphite means a material having a graphite-like crystal structure, examples of which include natural graphite, artificial graphite, and graphitized mesophase carbon particles.

In the lithium silicate phase, there are not so many sites that can react with lithium, and a new irreversible reaction hardly occurs during charge and discharge. Therefore, excellent charge-discharge efficiency is exhibited in the initial stage of charge and discharge.

Next, a detailed description will be given of a method of producing LSX particles.

Step (i)

Raw materials of lithium silicate that can be used are a Si raw material, a Li raw material, and an M raw material. These raw materials are mixed each in a predetermined amount and melted. The melt is passed between metal rollers and formed into flakes, to prepare silicate. Thereafter, the silicate flakes are heated at a temperature equal to or higher than the glass transition point and below the melting point in an air atmosphere, so that the flakes are crystallized. Note that the silicate flakes can be used without being crystallized. Also, silicate can be produced by heating the mixture of predetermined amounts of raw materials, without being melted, at a temperature equal to or lower than the melting point, to cause a solid phase reaction. Examples of the Si raw material include silicon oxide Examples of the Li raw material include lithium carbonate, lithium oxide, lithium hydroxide, and lithium hydride. These may be used singly or in combination of two or more kinds. Examples of the M raw material include an oxide, hydroxide, or carbonate of M. The amount of an alkali metal other than lithium (e.g., sodium, potassium) is preferably 5 mol % or less. The co-presence of an alkali metal other than lithium with silicate lowers the ion conductivity. Therefore, it is preferable to avoid the co-presence of an alkali metal other than lithium, if possible.

Step (ii)

Next, a raw material silicon is blended into the lithium silicate, to form a composite thereof. For example, composite particles are formed through the following processes (a) to (c).

Process (a)

First, raw material silicon powder and lithium silicate powder are mixed in a mass ratio of, for example, 20:80 to 95:5. The raw material silicon may be coarse particles of silicon having an average diameter of about several μm to several tens μm.

Process (b)

Next, the mixture of raw material silicon and lithium silicate is stirred while being pulverized into fine particles, using a pulverizer like a ball mill. At this time, it is preferable to add an organic solvent to the mixture and perform wet pulverization. A predetermined amount of the organic solvent may be fed all at once into a pulverizer vessel at the beginning of the pulverization, or may be fed dividedly in a plurality of times into the vessel in the course of pulverization. The organic solvent serves to prevent an object to be pulverized from adhering onto the inner wall of the vessel, and also serves as a raw material of the carbon material to be allowed to be present within the composite particles.

Examples of the organic solvent include alcohols, ethers, fatty acids, alkanes, cycloalkanes, silicate esters, and metal alkoxides. The alcohols may be primary, secondary, or tertiary alcohols. Examples of the alcohols include methanol, ethanol, butanol, isopropyl alcohol, ethylene glycol, glycerin, octanol, lauryl alcohol, myristyl alcohol, cetyl alcohol, stearyl alcohol, oleyl alcohol, and linolyl alcohol. Examples of the ethers include diethyl ether.

The fatty acids may be saturated or unsaturated fatty acids. Examples of the fatty acids include butanoic acid, pentanoic acid, hexanoic acid, heptanoic acid, octanoic acid, nonanoic acid, decanoic acid, dodecanoic acid, tridecanoic acid, tetradecanoic acid, pentadecanoic acid, hexadecanoic acid, heptadecanoic acid, octadecanoic acid, nonadecane, and icosanoic acid.

Examples of the alkanes include methane, ethane, butane, pentane, hexane, heptane, octane, nonan, decane, undecane, dodecane, tridecane, tetradecane, pentadecane, hexadecane, heptadecane, octadecane, nonadecane, and icosane. Examples of the cycloalkanes include cyclopentane, cyclohexane, cycloheptane, cyclooctane, cyclononane, cyclodecane, cycloundecane, cyclododecane, cyclotridecane, cyclotetradecane, cyclopentadecane, cyclohexadecane, cycloheptadecane, cyclooctadecane, cyclononadecane, and cycloicosane. Examples of the silicate esters include ethyl orthosilicate and methyl orthosilicate. Examples of the metal alkoxides include methyltrimethoxysilane. These organic solvents may be used singly, or in combination of two or more kinds.

When no organic solvent is used, a mixture of raw material silicon powder, lithium silicate powder, and carbon material powder may be fed into the pulverizer vessel.

Note that the raw material silicon and the lithium silicate may be mixed after pulverized separately into fine particles. Also, silicon nanoparticles, lithium silicate nanoparticles, and carbon nanoparticles may be each prepared without using a pulverizer, and mixed together. These nanoparticles can be prepared by any known method, such as a gas phase method (e.g., plasma method) or a liquid phase method (e.g., liquid phase reduction method).

Process (c)

Next, the mixture pulverized into fine particles are heated, for example, at 450° C. to 1000° C. in an inert atmosphere (e.g., argon or nitrogen atmosphere) to be sintered. In this way, composite particles including a lithium silicate phase and silicon particles dispersed in the lithium silicate phase may be obtained.

In the heating above, the mixture (primary particles) may be heated while applying pressure thereto (while forcing the primary particles to aggregate) by a hot press or the like, thereby to produce a sintered body of the mixture. The obtained sintered body is composed of an aggregate of a plurality of primary particles including a lithium silicate phase and silicon particles dispersed in the lithium silicate phase.

Lithium silicate is stable at 450° C. to 1000° C., and hardly reacts with silicon. Therefore, a capacity decrease is, if any, very small.

The sintered body (aggregate of primary particles) is then crushed until it becomes granules, which can be used as composite particles (secondary particles). At this time, by selecting the crushing conditions as appropriate, secondary particles having a predetermined average diameter can be obtained. The average diameter of the secondary particles is, for example, 1 to 20 μm. The average diameter of the secondary particles means a particle diameter (volume average particle diameter) at 50% cumulative volume in a particle size distribution measured by a laser diffraction/scattering method.

When, in the process (b), an organic solvent is added to the mixture while pulverized into fine particles, the finely pulverized mixture contains the organic solvent. In the course of pulverization, the organic solvent is likely to change due to rise in temperature by the collision energy of fine particles generated in association with pulverization, and is likely to be chemically bonded to fine particles and localized on the surfaces of the fine particles. Therefore, within the obtained secondary particles (sintered pieces), a carbon material (e.g., amorphous carbon) derived from the organic solvent tends to be formed like a network along the surfaces of the primary particles (fine particles). Depending on the timing of addition of the organic solvent and other conditions, the carbon material derived from the organic solvent is possibly formed within the primary particles, too. By changing the amount of the organic solvent to be added, the area ratio of the carbon material occupying the composite particles can be controlled.

Step (iii)

Next, at least part of the surface of the composite particles (secondary particles) may be coated with an electrically conductive material, to form an electrically conductive layer thereon. The conductive material is preferably electrochemically stable, and is preferably an electrically conductive carbon material. Examples of the method of coating the composite particles with the conductive carbon material include: a CVD method using a hydrocarbon gas, such as acetylene or methane, as a raw material; and a method of mixing coal pitch, petroleum pitch, phenol resin or the like with the composite particles, followed by heating and carbonizing. In another method, carbon black may be attached to the surface of the composite particles.

Step (iv)

The production method may include a step of washing the composite particles (including the case where the conductive layer is formed on the surface) with an acid. For example, washing the composite particles with an acidic aqueous solution can dissolve and remove a small amount of alkali component, which may have produced during the formation of a composite from the raw material silicon and the lithium silicate, from the surface of the composite particles. Examples of the acidic aqueous solution include an aqueous solution of an inorganic acid, such as hydrochloric acid, hydrofluoric acid, sulfuric acid, nitric acid, phosphoric acid, or carbonic acid, and an aqueous solution of an organic acid, such as citric acid or acetic acid.

FIG. 1 is a schematic cross-sectional view of one of LXS particles 20, which is one example of the negative electrode material.

The LXS particle 20 includes a base particle 23 comprising a secondary particle formed of a plurality of primary particles 24 aggregated together. The base particle 23 (or primary particle 24) includes a lithium silicate phase 21 and silicon particles 22 dispersed in the lithium silicate phase 21.

As illustrated in FIG. 1, a carbon material 25 is preferably present, inside the base particle 23, at at least part of the interface between the primary particles 24 adjacent to each other. Although not shown, the carbon material may be present also inside the primary particles 24 (e.g., inside the lithium silicate phase 21 or between the lithium silicate phase 21 and the silicon particles 22).

As illustrated in FIG. 1, the LSX particle 20 preferably further includes an electrically conductive material (conductive layer 26) covering at least part of the surface of the base particle 23. In this case, as illustrated in FIG. 1, the carbon material 25 is preferably present so as to extend linearly from the interior toward the surface of the base particle 23 along the interface between the primary particles 24 adjacent to each other, and an end of the carbon material 25 on the surface side of the base particle 23 is preferably in contact with the conductive material (conductive layer 26). The carbon material 25 and the conductive material (conductive layer 26) form a favorable conductive network from the surface to the interior of the base particle 23, which can further improve the battery capacity and the charge-discharge cycle characteristics.

The silicon particles 22 are preferably substantially uniformly dispersed within the lithium silicate phase 21. The base particle 23 (primary particle 24) has, for example, a sea-island structure in which fine silicon particles are dispersed in a matrix of the lithium silicate phase 21. In this case, in an arbitrary cross section of the base particle 23 (primary particle 24), the silicon particles 22 (simple Si) are substantially evenly scattered, without being localized in some regions.

The lithium silicate phase 21 and the silicon particle 22 both preferably comprise an assembly of microfine particles. The lithium silicate phase 21 is preferably composed of finer particles than those composing the silicon particle 22. In this case, the negative electrode material LSX 20 has an X-ray diffraction (XRD) pattern in which the diffraction peak intensity attributed to the (111) plane of simple Si is higher than that attributed to the (111) plane of the lithium silicate.

The base particle 23 may include other components, in addition to the lithium silicate phase 21, the silicon particles 22, and the carbon material. For example, the lithium silicate phase 21 may contain a small amount of crystalline or amorphous $SiO_2$, in addition to lithium silicate. The amount of $SiO_2$ in the base particles 23 as measured by Si-NMR is, for example, preferably 30 mass % or less, more preferably less than 7 mass %.

The amount of the silicon particles 22 (simple Si) occupying the base particles 23 as measured by Si-NMR is preferably 20 mass % to 95 mass %, more preferably 35 mass % to 75 mass % in view of achieving a higher capacity and improving the cycle characteristics. In this case, a high charge-discharge capacity can be ensured, and lithium ions can diffuse smoothly, tending to lead to excellent load characteristics. In addition, the surfaces of the silicon particles that come in contact with the electrolyte by being exposed without being covered with the lithium silicate phase can be reduced, and thereby, the deterioration of the cycle characteristics can be suppressed.

Desirable Si-NMR measurement conditions are as below.

<Si-NMR Measurement Conditions>

Measuring apparatus: solid nuclear magnetic resonance spectrometer (INOVA-400), available from Varian, Inc.

Probe: Varian 7 mm CPMAS-2

MAS: 4.2 kHz

MAS speed: 4 kHz

Pulse: DD (45° pulse+signal capture time 1H decoupling)

Repetition time: 1200 sec

Observation width: 100 kHz
Observation center: around −100 ppm
Signal capture time: 0.05 sec
Number of times of accumulation: 560
Sample amount: 207.6 mg The primary particles 24 have an average diameter of preferably 0.2 to 10 µm, more preferably 2 to 8 µm. In this case, the stress due to changes in volume of the negative electrode material during charge and discharge tends to be further reduced, and excellent cycle characteristics tend to be obtained. In addition, since the composite particles can have an appropriate surface area, the decrease in capacity due to a side reaction with the electrolyte can be suppressed.

The average diameter of the primary particles 24 can be measured by observing a cross section of the negative electrode material using a SEM. Specifically, with respect to randomly selected 100 primary particles 24, the diameter of an equivalent circle (a circle having the same area as the cross-sectional area of the primary particle) of each particle is measured, and the measured values are averaged.

The average diameter of the silicon particles 22 is, before the first charge, 500 nm or less, preferably 200 nm or less, more preferably 50 nm or less. The silicon particles 22 moderately refined as above undergo less changes in volume during charge and discharge, and exhibit improved structural stability. The average diameter of the silicon particles 22 can be measured by observing a cross section of the negative electrode material using a SEM or TEM. Specifically, with respect to randomly selected 100 silicon particles 22, the maximum diameter is measured, and the measured values are averaged.

A non-aqueous electrolyte secondary battery according to an embodiment of the present invention includes a negative electrode including the above-described negative electrode material, a positive electrode, and an electrolyte. Description will be given below of the negative electrode, the positive electrode, and the electrolyte.

[Negative Electrode]

The negative electrode includes, for example, a negative electrode current collector, and a negative electrode mixture layer formed on a surface of the negative electrode current collector and containing a negative electrode active material. The negative electrode mixture layer can be formed by applying a negative electrode shiny comprising a negative electrode mixture dispersed in a dispersion medium, onto a surface of the negative electrode current collector, and drying the slurry. The dry applied film may be rolled, if necessary. The negative electrode mixture layer may be formed on one surface or both surfaces of the negative electrode current collector.

The negative electrode mixture includes, as an essential component, the above-described negative electrode material that serves as the negative electrode active material, and may include a binder, an electrically conductive agent, a thickener; and other optional components. The silicon particles in the negative electrode material can absorb many lithium ions, and therefore, can contribute to increase the capacity of the negative electrode.

The negative electrode active material preferably further includes a carbon-based active material that electrochemically absorbs and releases lithium ions. The negative electrode material expands and contracts in volume in association with charge and discharge. Therefore, increasing the ratio thereof in the negative electrode active material may cause a contact failure, in association with charge and discharge, between the negative electrode active material and the negative electrode current collector. However, by using the negative electrode material and a carbon-based active material in combination, excellent cycle characteristics can be achieved, while a high capacity of the silicon particles can be imparted to the negative electrode. The ratio of the negative electrode material to the total of the negative electrode material and the carbon-based active material is preferably, for example, 3 to 30 mass %. In this case, a higher capacity as well as improved cycle characteristics tend to be achieved.

Examples of the carbon-based active material include graphite, graphitizable carbon (soft carbon), and non-graphitizable carbon (hard carbon). Preferred among them is graphite, which is stable during charge and discharge and whose irreversible capacity is small. The graphite means a material having a graphite-like crystal structure, examples of which include natural graphite, artificial graphite, and graphitized mesophase carbon particles. The carbon-based material may be used singly or in combination of two or more kinds.

Examples of the negative electrode current collector include a non-porous electrically conductive substrate (e.g., metal foil) and a porous electrically conductive substrate (e.g., mesh, net, punched sheet). The negative electrode current collector may be made of, for example, stainless steel, nickel, a nickel alloy, copper, or a copper alloy. The negative electrode current collector may have any thickness. In view of balancing between maintaining the strength and reducing the weight of the negative electrode, the thickness is preferably 1 to 50 µm, more preferably 5 to 20 µm.

The binder includes at least a first resin. The first resin is at least one selected from the group consisting of polyacrylic acid, a polyacrylic acid salt, and their derivatives. A preferred polyacrylic acid salt is a Li or Na salt. Particularly preferred is a cross-linked polyacrylic acid lithium.

The amount of the first resin in the negative electrode active material layer is preferably 2 mass % or less, more preferably 0.2 mass % or more and 2 mass % or less.

The first resin may be used in combination with a second resin. Examples of the second resin include: fluorocarbon resin, such as polytetrafluoroethylene and polyvinylidene fluoride (PVDF); polyolefin resin, such as polyethylene and polypropylene; polyimide resin, such as aramid resin; polyimide resin, such as polyimide and polyamide-imide; vinyl resin, such as polyvinyl acetate; polyvinyl pyrrolidone; polyether sulfone; and a rubbery material, such as styrene-butadiene copolymer robber (SBR). These may be used singly or in combination of two or more kinds. The second resin may be an acrylic resin other than the first resin Examples of the acrylic resin other than the first resin include methyl acrylate, ethylene-acrylic acid copolymers, polyacrylonitrile, polymethacrylic acid, polymethacrylic acid salts, and their derivatives.

Examples of the conductive agent include: carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds.

Examples of the thickener include: carboxymethyl cellulose (CMC) and modified products thereof (including salts, such as Na salt); cellulose derivatives (e.g., cellulose ethers), such as methyl cellulose; saponificated products of a polymer having a vinyl acetate unit, such as polyvinyl alcohol;

polyethers (e.g., polyalkylene oxide, such as polyethylene oxide). These may be used singly or in combination of two or more kinds.

Examples of the dispersion medium include: water; alcohols, such as ethanol; ethers, such as tetrahydrofuran; amides, such as dimethylformamide; N-methyl-2-pyrrolidone (NMP); and a mixed solvent of these.

[Positive Electrode]

The positive electrode includes, for example, a positive electrode current collector, and a positive electrode mixture layer formed on a surface of the positive electrode current collector. The positive electrode mixture layer can be formed by applying a positive electrode slurry of a positive electrode mixture dispersed in a dispersion medium, onto a surface of the positive electrode current collector, and drying the slurry. The dry applied film may be rolled, if necessary. The positive electrode mixture layer may be formed on one surface or both surfaces of the positive electrode current collector.

The positive electrode mixture includes, as an essential component, a positive electrode active material, and may include a binder, an electrically conductive agent, and other optional components.

The positive electrode active material may be a lithium composite metal oxide. Examples of the lithium composite metal oxide include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. Here, M represents at least one selected from Na, Mg, Sc, Y, Mn, Fe, Co, Ni, Cu, Zn, Al, Cr, Pb, Sb and B. Me includes at least one transition element (e.g., at least one selected from the group consisting of Mn, Fe, Co and Ni). a=0 to 1.2, b=0 to 0.9, and c=2.0 to 2.3. Note that "a" representing the molar ratio of lithium is a value immediately after the preparation of the active material and is subjected to increase and decrease during charge and discharge.

Examples of the binder and the conductive agent are similar to those exemplified for the negative electrode. Additional examples of the conductive agent include graphite, such as natural graphite and artificial graphite.

The form and the thickness of the positive electrode current collector may be respectively selected from the forms and the range corresponding to those of the negative electrode current collector. The positive electrode current collector may be made of, for example, stainless steel, aluminum, an aluminum alloy, and titanium.

[Electrolyte]

The electrolyte contains a solvent, and a lithium salt dissolved in the solvent. The concentration of the lithium salt in the electrolyte is, for example, 0.5 to 2 mol/L. The electrolyte may contain a known additive.

The solvent may be aqueous or non-aqueous. The non-aqueous solvent may be, for example, a cyclic carbonic acid ester, a chain carbonic acid ester, or a cyclic carboxylic acid ester. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The non-aqueous solvent may be used singly, or in combination of two or more kinds.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiBF_4$, $LiSbF_6$, $LiAsF_6$, $LiCF_3SO_3$, $LiCF_3CO_2$), a lithium salt of a fluorine-containing acid imide (e.g., $LiN(CF_3SO_2)_2$, $LiN(CF_3SO_2)(C_4F_9SO_2)$, $LiN(C_2F_5SO_2)_2$), and a lithium halide (e.g., LiCl, LiBr, LiI). These lithium salts may be used singly or in combination of two or more kinds.

[Separator]

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

The non-aqueous electrolyte secondary battery, for example, has a structure in which an electrode group formed by winding the positive electrode and the negative electrode with the separator interposed therebetween is housed in an outer case, together with the electrolyte. The wound-type electrode group may be replaced with a different form of electrode group, for example, a stacked-type electrode group formed by stacking the positive electrode and the negative electrode with the separator interposed therebetween. The non-aqueous electrolyte secondary battery may be in any ken, such as cylindrical type, prismatic type, coin type, button type, or laminate type.

Figure 2:
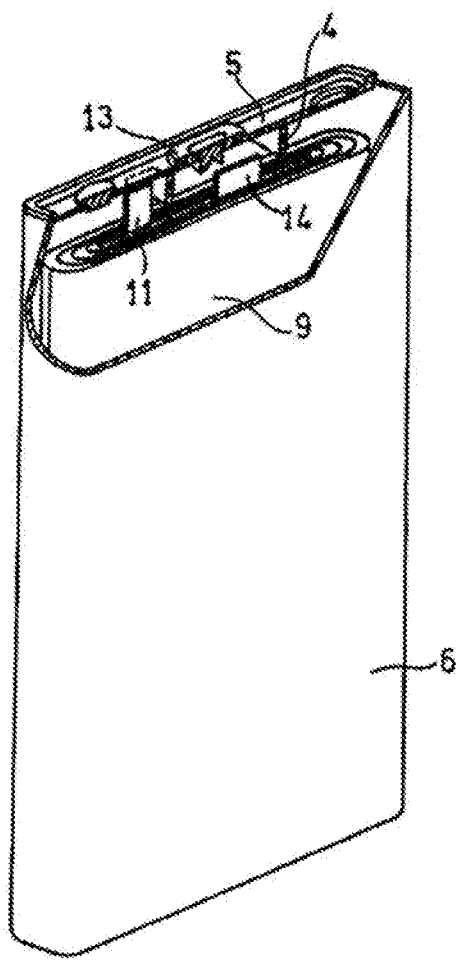
FIG. 2 A schematic partially cut-away oblique view of a non-aqueous electrolyte secondary battery according to an embodiment of the present invention.

FIG. 2 is a schematic partially cut-away oblique view of a prismatic non-aqueous electrolyte secondary battery according to an embodiment of the present invention.

The battery includes a bottomed prismatic battery case 6, and an electrode group 9 and an electrolyte (not shown) housed in the battery case 6. The electrode group 9 has a long negative electrode, a long positive electrode, and a separator interposed between the positive electrode and the negative electrode and preventing them from directly contacting with each other. The electrode group 9 is formed by winding the negative electrode, the positive electrode, and the separator around a flat plate-like winding core, and then removing the winding core.

A negative electrode lead 14 is attached at its one end to the negative electrode current collector of the negative electrode, by means of welding or the like. A positive electrode lead 11 is attached at its one end to the positive electrode current collector of the positive electrode, by means of welding or the like. The negative electrode lead 14 is electrically connected at its other end to a negative electrode terminal 13 disposed at a sealing plate 5. The positive electrode lead 11 is electrically connected at its other end to the battery case 6 serving as a positive electrode terminal. A resin frame member 4 is disposed on top of the electrode group 9, the frame member serving to insulate the electrode group 9 from the sealing plate 5, as well as to insulate the negative electrode lead 14 from the battery case 6. The opening of the battery case 6 is sealed with the sealing plate 5.

EXAMPLES

The present invention will be specifically described below with reference to Examples and Comparative Examples. It is to be noted, however, the present invention is not limited to the following Examples.

Example 1

[Preparation of LSX Particles]

Step (i)

Lithium oxide, silicon dioxide, calcium oxide, boron oxide, and aluminum oxide were mixed in a molar ratio of $Li_2O/SiO_2/CaO/B_2O_3/Al_2O_3=22/72/1/2/3$. The mixture was melted in an inert atmosphere at 1500° C. for 5 hours. The melt was passed between metal rollers and formed into flakes, which was then subjected to heat treatment at 750° C. for 5 hours, to form a lithium silicate composite oxide containing Li, Si, Ca, B, and Al and being in the form of an amorphous-crystalline mixed phase. The obtained lithium silicate composite oxide was pulverized to have an average particle diameter of 10 μm.

Step (ii)

The lithium silicate composite oxide having an average particle diameter of 10 μm and a raw material silicon (3N, average particle diameter: 10 μm) were mixed in a mass ratio of 50:50. The mixture was placed in a pot (made of SUS, volume: 500 mL) of a planetary ball mill (P-5, available from Fritsch Co., Ltd.), together with 24 SUS balls (diameter: 20 min). In the pot with the lid closed, the mixture was pulverized at 200 rpm for 25 hours in an inert atmosphere. In the above, ethanol was added as an organic solvent to the mixture placed in the pot. The amount of ethanol added was 0.016 parts by mass per 100 parts by mass of the mixture of lithium silicate composite oxide and raw material silicon.

Next, the powdered mixture was taken out from the pot in an inert atmosphere, which was then heated at 600° C. for 4 hours, in an inert atmosphere, with a predetermined pressure applied by a hot press, to give a sintered body of the mixture.

Step (iii)

Thereafter, the sintered body was crushed and passed through a 40-μm mesh, and then mixed with a coal pitch (MCP 250, available from JFE Chemical Corporation). The mixture was heated at 800° C. for 5 hours in an inert atmosphere, to coat composite particles with an electrically conductive carbon and thereby form a conductive layer thereon. The conductive layer was formed in an amount of 5 mass %, relative to the total mass of the composite particles and the conductive layer. Thereafter, with a sieve, LSX particles (secondary particles) having an average diameter of 10 μm and including the composite particles and the conductive layer formed on the surfaces of the composite particles.

[Analysis of Composite Particles]

A cross section of the LSX particles were observed under a scanning electron microscope (SEM). The observation confirmed that the composite particles were composed of the secondary particles in which primary particles (average particle diameter 3 μm) were aggregated together. The observation further confirmed that, in the composite particles, silicon particles having an average diameter of 50 nm were dispersed substantially uniformly in a matrix consisting of the lithium silicate composite oxide in the form of an amorphous-crystalline mixed phase containing Li, Si, Ca, B, and Al. Also, the amount of each element in the lithium silicate phase was measured by ICP emission spectroscopy. Note that with respect to the Si element in the lithium silicate phase, since the lithium silicate and the silicon particles are present in the composite particles, distinction therebetween is necessary. Specifically, the amount of Si contained in the whole negative electrode active material was measured by ICP emission spectroscopy. As for the Si particles dispersed in the lithium silicate phase, the composite particles were heated at 930° C. for 10 hours in a vacuum atmosphere, to be crystallized. The resultant powder was analyzed by XRD, and from the integrated intensity of the Si peak, a Si content was calculated. From the measurement results, the amount of Si element in the lithium silicate phase was determined by calculation. The result found that the amount of Li was 34.6 mol %, the amount of Si was 56.7 mol %, the amount of Ca was 0.8 mol %, the amount of B was 3.1 mol %, and the amount of Al was 4.7 mol %. In the XRD pattern of the composite particles, a diffraction peak derived mainly from single Si was confirmed; however, no peak of a lithium silicate complex oxide in an amorphous phase containing Li, Si, Ca, B and Al was observed, and no peak of $Li_2O$, $SiO_2$, CaO, $B_2O_3$, $Al_2O_3$, or the like was observed.

Using a SEM cross-sectional image of the LSX particles, elemental analysis was performed by energy-dispersive X-ray spectroscopy (EDX). The result of EDX element mapping confirmed that, inside the composite particles, the carbon material was mostly present along the interface between the adjacent primary particles, and some carbon material was present inside the primary particles. Also, the composite particles were measured by Si-NMR. The result found that the amount of $SiO_2$ was less than 7 mass % (less than the detection lower limit), and the area ratio of the carbon material occupying a cross section of the composite particles was 0.01%.

The Vickers hardness of the lithium silicate phase was measured on its cross section. The result found that the Vickers hardness under the conditions of a load of 1 kg and a load holding time of 15 sec was 708 Hv.

[Production of Negative Electrode]

The composite particles having the conductive layer were mixed with graphite in a mass ratio of 5:95, and the resultant mixture was used as a negative electrode active material. The negative electrode active material was mixed with sodium carboxymethyl cellulose (CMC-Na), styrene-butadiene rubber (SBR), and polyacrylic acid lithium in a mass ratio of 96.5:1:1.5:1, to which water was added. The mixture was stirred in a mixer (T.K. HIVIS MIX, available from PRIMIX Corporation), to prepare a negative electrode shiny. Next, the negative electrode shiny was applied onto copper foil, so that the mass of a negative electrode mixture per 1 $m^2$ of the copper foil was 190 g. The applied film was dried, and then rolled, to give a negative electrode with a negative electrode mixture layer having a density of 1.5 $g/cm^3$ formed on both sides of the copper foil.

[Production of Positive Electrode]

Lithium cobalt oxide, acetylene black, and polyvinylidene fluoride were mixed in a mass ratio of 95:2.5:2.5. The mixture was added with N-methyl-2-pyrrolidone (NMP), and then stirred in a mixer (T.K. HIVIS MIX, available from PRIMIX Corporation), to prepare a positive electrode shiny. Next, the positive electrode slurry was applied onto aluminum foil. The applied film was dried, and then rolled, to give a positive electrode with a positive electrode mixture layer having a density of 3.6 $g/cm^3$ on both sides of the aluminum foil.

[Preparation of Electrolyte]

In a mixed solvent containing ethylene carbonate (EC) and diethyl carbonate (DEC) in a volume ratio of 3:7, $LiPF_6$ was dissolved at concentration of 1.0 mol/L, to prepare a non-aqueous electrolyte.

[Fabrication of Non-Aqueous Electrolyte Secondary Battery]

The positive electrode and the negative electrode, with a tab attached to each electrode, were wound spirally with a separator interposed therebetween such that the tabs were positioned at the outermost layer, thereby to form an electrode group. The electrode group was inserted into an outer case made of aluminum laminate film and dried under vacuum at 105° C. for 2 hours. The non-aqueous electrolyte was injected into the case, and the opening of the outer case was sealed. A non-aqueous electrolyte secondary battery X1 was thus obtained.

Comparative Example 1

A non-aqueous electrolyte secondary battery Y1 was fabricated in the same manner as in Example 1, except that in the step (ii), no ethanol was added when pulverizing.

Examples 2 to 7 and Comparative Examples 2 to 5

Non-aqueous electrolyte secondary batteries X2 to X7 and Y2 to Y5 were fabricated in the same manner as in Example 1, except that in the step (ii), the amount of ethanol added was changed as shown in Table 1.

Example 8

A non-aqueous electrolyte secondary battery XS was fabricated in the same manner as in Example 1, except that in the step (i), lithium oxide, silicon dioxide, boron oxide, and aluminum oxide were mixed in a molar ratio of $Li_2O/SiO_2/B_2O_3/Al_2O_3=22/58/10/10$, and in the step (ii), the mixture of lithium silicate composite oxide and raw material silicon was pulverized for 19 hours, and 2 parts by mass of ethanol was added per 100 parts by mass of the mixture.

Example 9

A non-aqueous electrolyte secondary battery X9 was fabricated in the same manner as in Example 1, except that in the step (i), and lithium oxide, silicon dioxide, boron oxide, and aluminum oxide were mixed in a molar ratio of $Li_2O/SiO_2/B_2O_3/Al_2O_3=22/48/15/15$, and in the step (ii), the mixture of lithium silicate composite oxide and raw material silicon was pulverized for 18 hours, and 2 parts by mass of ethanol was added per 100 parts by mass of the mixture.

Example 10

A non-aqueous electrolyte secondary battery X10 was fabricated in the same manner as in Example 1, except that in the step (i), lithium oxide, silicon dioxide, calcium oxide, magnesium oxide, boron oxide, and aluminum oxide were mixed in a molar ratio of $Li_2O/SiO_2/CaO/MgO/B_2O_3/Al_2O_3=22/67/1/5/2/3$, and in the step (ii), the mixture of lithium silicate composite oxide and raw material silicon was pulverized for 26 hours, and 2 parts by mass of ethanol was added per 100 parts by mass of the mixture.

Example 11

A non-aqueous electrolyte secomfary battery X11 was fabricated in the same manner as in Example 1, except that in the step (i), lithium oxide, silicon dioxide, calcium oxide, boron oxide, aluminum oxide, and zirconium oxide were mixed in a molar ratio of $Li_2O/SiO_2/CaO/B_2O_3/Al_2O_3/ZrO_2=22/67/1/2/3/5$, and in the step (ii), the mixture of lithium silicate composite oxide and raw material silicon was pulverized for 20 hours, and 2 parts by mass of ethanol was added per 100 parts by mass of the mixture.

Example 12

A non-aqueous electrolyte secondary battery X12 was fabricated in the same manner as in Example 1, except that in the step (i), lithium oxide, silicon dioxide, calcium oxide, boron oxide, aluminum oxide, and niobium oxide were mixed in a molar ratio of $Li_2O/SiO_2/CaO/B_2O_3/Al_2O_3/Nb_2O_5=22/67/1/2/3/5$, and in the step (ii), the mixture of lithium silicate composite oxide and raw material silicon was pulverized for 21 hours, and 2 parts by mass of ethanol was added per 100 parts by mass of the mixture.

Example 13

A non-aqueous electrolyte secondary battery X13 was fabricated in the same manner as in Example 1, except that in the step (i), lithium oxide, silicon dioxide, calcium oxide, boron oxide, aluminum oxide, and tantalum oxide were mixed in a molar ratio of $Li_2O/SiO_2/CaO/B_2O_3/Al_2O_3/Ta_2O_5=22/67/1/2/3/5$, and in the step (ii), the mixture of lithium silicate composite oxide and raw material silicon was pulverized for 20 hours, and 2 parts by mass of ethanol was added per 100 parts by mass of the mixture.

Example 14

A non-aqueous electrolyte secondary battery X14 was fabricated in the same manner as in Example 1, except that in the step (i), lithium oxide, silicon dioxide, calcium oxide, boron oxide, aluminum oxide, and lanthanum oxide were mixed in a molar ratio of $Li_2O/SiO_2/CaO/B_2O_3/Al_2O_3/La_2O_5=22/67/1/2/3/5$, and in the step (ii), the mixture of lithium silicate composite oxide and raw material silicon was pulverized for 20 hours, and 2 parts by mass of ethanol was added per 100 parts by mass of the mixture.

Example 15

A non-aqueous electrolyte secondary battery X15 was fabricated in the same manner as in Example 1, except that in the step (i), lithium oxide, silicon dioxide, calcium oxide, boron oxide, aluminum oxide, and vanadium oxide were mixed in a molar ratio of $Li_2O/SiO_2/CaO/B_2O_3/Al_2O_3/V_2O_5=22/67/1/2/3/5$, and in the step (ii), the mixture of lithium silicate composite oxide and raw material silicon was pulverized for 19 hour, and 2 parts by mass of ethanol was added per 100 parts by mass of the mixture.

Example 16

A non-aqueous electrolyte secondary battery X16 was fabricated in the same manner as in Example 1, except that in the step (i), lithium oxide, silicon dioxide, calcium oxide, boron oxide, aluminum oxide, and yttrium oxide were mixed in a molar ratio of $Li_2O/SiO_2/CaO/B_2O_3/Al_2O_3/Y_2O_3=22/67/1/2/3/5$, and in the step (ii), the mixture of lithium silicate composite oxide and raw material silicon was pulverized for 18 hours, and 2 parts by mass of ethanol was added per 100 parts by mass of the mixture.

Example 17

Anon-aqueous electrolyte secondary battery X17 was fabricated in the same manner as in Example 1, except that in the step (i), lithium oxide, silicon dioxide, calcium oxide, boron oxide, aluminum oxide, and titanium oxide were mixed in a molar ratio of $Li_2O/SiO_2/CaO/B_2O_3/Al_2O_3/TiO_2=22/67/1/2/3/5$, and in the step (ii), the mixture of lithium silicate composite oxide and raw material silicon was pulverized for 32 hours, and 2 parts by mass of ethanol was added per 100 parts by mass of the mixture.

Example 18

Anon-aqueous electrolyte secondary battery X18 was fabricated in the same manner as in Example 1, except that in the step (i), lithium oxide, silicon dioxide, calcium oxide, boron oxide, aluminum oxide, and phosphorus pentoxide were mixed in a molar ratio of $Li_2O/SiO_2/CaO/B_2O_3/Al_2O_3/P_2O_5=22/67/1/3/5$, and in the step (ii), the mixture of lithium silicate composite oxide and raw material silicon was pulverized for 40 hours, and 2 parts by mass of ethanol was added per 100 parts by mass of the mixture.

Example 19

Anon-aqueous electrolyte secondary battery X19 was fabricated in the same manner as in Example 1, except that in the step (i), lithium oxide, silicon dioxide, calcium oxide, boron oxide, aluminum oxide, and tungsten oxide were mixed in a molar ratio of $Li_2O/SiO_2/CaO/B_2O_3/Al_2O_3/WO_3=22/67/1/2/3/5$, and in the step (ii), the mixture of lithium silicate composite oxide and raw material silicon was pulverized for 35 hours, and 2 parts by mass of ethanol was added per 100 parts by mass of the mixture.

Example 20

A non-aqueous electrolyte secondary battery X20 was fabricated in the same manner as in Example 1, except that in the step (i), lithium oxide, silicon dioxide, calcium oxide, magnesium oxide, boron oxide, aluminum oxide, zirconium oxide, titanium oxide, phosphorus pentoxide, and tungsten oxide were mixed inn a molar ratio of $Li_2O/SiO_2/CaO/MgO/B_2O_3/Al_2O_3/ZrO_2/TiO_2/P_2O_5/WO_3=22/55/2/3/5/51171/5/1$, and in the step (ii), the mixture of lithium silicate composite oxide and raw material silicon was pulverized for 23 hours, and 2 parts by mass of ethanol was added per 100 parts by mass of the mixture.

Example 21

A non-aqueous electrolyte secondary battery X21 was fabricated in the same manner as in Example 1, except that in the step (i), lithium oxide, silicon dioxide, boron oxide, and aluminum oxide were mixed in a molar ratio of $Li_2O/SiO_2/CaO/B_2O_3/Al_2O_3=15/65/10/10$, and in the step (ii), the mixture of lithium silicate composite oxide and raw material silicon was pulverized for 17 hoists, and 2 parts by mass of ethanol was added per 100 parts by mass of the mixture.

Example 22

A non-aqueous electrolyte secondary battery X22 was fabricated in the same manner as in Example 1, except that in the step (i), lithium oxide, silicon dioxide, boron oxide, and aluminum oxide were mixed in a molar ratio of $Li_2O/SiO_2/CaO/B_2O_3/Al_2O_3=8/72/10/10$, and in the step (ii), the mixture of lithium silicate composite oxide and raw material silicon was pulverized for 16 hours, and 2 parts by mass of ethanol was added per 100 parts by mass of the mixture.

Example 23

A non-aqueous electrolyte secondary battery X23 was fabricated in the same manner as in Example 1, except that in the step (i), lithium oxide, silicon dioxide, boron oxide, and aluminum oxide were mixed in a molar ratio of $Li_2O/SiO_2/CaO/B_2O_3/Al_2O_3=3/77/10/10$, and in the step (ii), the mixture of lithium silicate composite oxide and raw material silicon was pulverized for 15 hours, and 2 parts by mass of ethanol was added per 100 parts by mass of the mixture.

Example 24

A non-aqueous electrolyte secondary battery X24 was fabricated in the same manner as in Example 1, except that in the step (i), lithium oxide, silicon dioxide, and boron oxide were mixed in a molar ratio of $Li_2O/SiO_2/CaO/B_2O_3=33/47/20$, and in the step (ii), the mixture of lithium silicate composite oxide and raw material silicon was pulverized for 35 hours, and 2 parts by mass of ethanol was added per 100 parts by mass of the mixture.

Comparative Example 6

A non-aqueous electrolyte secondary battery Y6 was fabricated in the same manner as in Example L except that in the step ti), lithium oxide and silicon dioxide were mixed in a molar ratio of $Li_2O/SiO_2=50/50$ and in the step (ii), the mixture of lithium silicate composite oxide and raw material silicon was pulverized for 50 hours, and 2 parts by mass of ethanol was added per 100 parts by mass of the mixture.

Comparative Example 7

A non-aqueo electrolyte secondary battery Y7 was fabricated the same manner as in Example 1, except that in the step (ii), lithium oxide, silicon dioxide, and calcium oxide were maxed in a molar ratio of $Li_2O/SiO_2/CaO=33/47/20$, and in the step (i), the mixture of lithium silicate composite oxide and raw material silicon was pulverized for 40 hours, and 2 parts by mass of ethanol was added per 100 parts by mass of the mixture.

The batteries of Examples and Comparative Examples were each evaluated for the following items.

[Area Ratio of Carbon Material Occupying Cross Section of Composite Particles]

The battery having been subjected to the below-described charge-discharge cycle test was disassembled, to take out the negative electrode, which was then polished with a cross section polisher (CP), to obtain a cross section of the negative electrode mixture layer. On a SEM cross-sectional image of the negative electrode mixture layer, 10 LSX particles having a maximum diameter of 5 μm or more were randomly selected, which were then each subjected to an EDX analysis, to determine an area ratio of the carbon material occupying a cross section of the composite particle. The obtained measured values of the 10 particles were averaged. The EDX analysis was performed within 1 μm inward from the peripheral edge of the cross section of the LSX particle, so that the measurement area includes neither the conductive layer covering the composite particle nor the coating film formed on the surface of the conductive layer during charge and discharge.

[First Charge Capacity]

A constant-current charge was performed at a current of 1 It (800 mA) until the voltage reached 4.2 V, and then a constant-voltage charge was performed at a voltage of 4.2 V until the current reached 1/20 It (40 mA). The charge capacity was expressed as an index number, with the charge capacity of Comparative Example 1 taken as 100. The initial capacity was judged as good when the charge capacity was 92 or more.

[Charge-Discharge Cycle Test]

Charge and discharge were repeated under the following conditions.

<Charge>

A constant-current charge was performed at a current of 1 It (800 mA) until the voltage reached 4.2 V, and then a constant-voltage charge was performed at a voltage of 4.2 V until the current reached 1/20 It (40 mA).

<Discharge>

A constant-current discharge was performed at 1 It (800 mA) until the voltage reached 2.75 V.

The rest time between charge and discharge was 10 min. The ratio of the discharge capacity at the 100th cycle to the discharge capacity at the 1st cycle was defined as a cycle retention ratio, and with the number of cycles of Example 5 taken as 100, the others were expressed as an index number. The charge-discharge characteristics were judged as good when the cycle retention ratio was 85 or more.

The evaluation results are shown in Table 1. The Vickers hardness of the lithium silicate phase measured on its cross section are also shown in Table 1.

TABLE 1

| Battery | | Li | Si | Ca | Mg | B | Al | Zr | Nb | Ta | La | V | Y | Ti | P | W | Silicate phase Vickers hardness Hv | Pulverizing duration b | Ethanol Amount added % | Area ratio of carbon material occupying cross section of composite particle % | Cycle Retention ratio Index | First Charge capacity Index |
|---|---|---|---|---|---|---|---|---|---|---|---|---|---|---|---|---|---|---|---|---|---|---|
| Com. Ex. 1 | Y1 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | 708 | 25 | 0 | 0 | 75 | 100 |
| Com. Ex. 2 | Y2 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 0.0016 | 0.001 | 80 | 100 |
| Com. Ex. 3 | Y3 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 0.005 | 0.004 | 81 | 100 |
| Ex. 1 | X1 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 0.016 | 0.012 | 88 | 100 |
| Ex. 2 | X2 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 0.1 | 0.05 | 93 | 100 |
| Ex. 3 | X3 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 0.5 | 0.3 | 95 | 100 |
| Ex. 4 | X4 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 1 | 0.5 | 97 | 100 |
| Ex. 5 | X5 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 2 | 1.19 | 97 | 100 |
| Ex. 6 | X6 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 5 | 2.9 | 96 | 99 |
| Ex. 7 | X7 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 10 | 5.8 | 97 | 92 |
| Com. Ex. 4 | Y4 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 12 | 7.2 | 97 | 90 |
| Com. Ex. 5 | Y5 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | " | " | 16 | 9.6 | 97 | 85 |
| Ex. 8 | X8 | 31.0 | 40.8 | 0.0 | 0.0 | 14.1 | 14.1 | 0.0 | 0.0 | 0.0 | 0.0 | 0.0 | 0.0 | 0.0 | 0.0 | 0.0 | 742 | 19 | 2 | 1.2 | 98 | 100 |
| Ex. 9 | X9 | 28.9 | 31.6 | 0.0 | 0.0 | 19.7 | 19.7 | 0.0 | 0.0 | 0.0 | 0.0 | 0.0 | 0.0 | 0.0 | 0.0 | 0.0 | 753 | 18 | 2 | 1.2 | 98 | 100 |
| Ex. 10 | X10 | 34.6 | 52.8 | 0.8 | 0.0 | 3.1 | 4.7 | 0.0 | 0.0 | 0.0 | 0.0 | 0.0 | 0.0 | 0.0 | 0.0 | 0.0 | 710 | 26 | 2 | 1.2 | 97 | 100 |
| Ex. 11 | X11 | 34.6 | 52.8 | 0.0 | 3.9 | 3.1 | 4.7 | 0.0 | 0.0 | 0.0 | 0.0 | 0.0 | 0.0 | 0.0 | 0.0 | 0.0 | 740 | 20 | 2 | 1.2 | 100 | 100 |
| Ex. 12 | X12 | 33.3 | 50.8 | 0.8 | 0.0 | 3.0 | 4.5 | 3.9 | 0.0 | 0.0 | 0.0 | 0.0 | 0.0 | 0.0 | 0.0 | 0.0 | 735 | 21 | 2 | 1.2 | 100 | 100 |
| Ex. 13 | X13 | 33.3 | 50.8 | 0.8 | 0.0 | 3.0 | 4.5 | 0.0 | 7.6 | 0.0 | 0.0 | 0.0 | 0.0 | 0.0 | 0.0 | 0.0 | 740 | 20 | 2 | 1.2 | 100 | 100 |
| Ex. 14 | X14 | 33.3 | 50.8 | 0.8 | 0.0 | 3.0 | 4.5 | 0.0 | 0.0 | 7.6 | 0.0 | 0.0 | 0.0 | 0.0 | 0.0 | 0.0 | 739 | 20 | 2 | 1.2 | 100 | 100 |
| Ex. 15 | X15 | 33.3 | 50.8 | 0.8 | 0.0 | 3.0 | 4.5 | 0.0 | 0.0 | 0.0 | 7.6 | 0.0 | 0.0 | 0.0 | 0.0 | 0.0 | 743 | 19 | 2 | 1.2 | 95 | 100 |
| Ex. 16 | X16 | 33.3 | 50.8 | 0.8 | 0.0 | 3.0 | 4.5 | 0.0 | 0.0 | 0.0 | 0.0 | 7.6 | 0.0 | 0.0 | 0.0 | 0.0 | 747 | 18 | 2 | 1.2 | 100 | 100 |
| Ex. 17 | X17 | 34.6 | 52.8 | 0.8 | 0.0 | 3.1 | 4.7 | 0.0 | 0.0 | 0.0 | 0.0 | 0.0 | 7.6 | 0.0 | 0.0 | 0.0 | 680 | 32 | 2 | 1.2 | 98 | 100 |
| Ex. 18 | X18 | 33.3 | 50.8 | 0.8 | 0.0 | 3.0 | 4.5 | 0.0 | 0.0 | 0.0 | 0.0 | 0.0 | 0.0 | 3.9 | 0.0 | 0.0 | 600 | 40 | 2 | 1.2 | 99 | 100 |
| Ex. 19 | X19 | 34.6 | 52.8 | 0.8 | 0.0 | 3.1 | 4.7 | 0.0 | 0.0 | 0.0 | 0.0 | 0.0 | 0.0 | 0.0 | 7.6 | 0.0 | 650 | 35 | 2 | 1.2 | 99 | 100 |
| Ex. 20 | X20 | 32.1 | 40.1 | 1.5 | 2.2 | 7.3 | 7.3 | 0.0 | 0.0 | 0.0 | 0.0 | 0.0 | 0.0 | 0.7 | 7.3 | 0.7 | 733 | 23 | 2 | 1.2 | 97 | 100 |
| Ex. 21 | X21 | 22.2 | 48.1 | 0.0 | 0.0 | 14.8 | 14.8 | 0.0 | 0.0 | 0.0 | 0.0 | 0.0 | 0.0 | 0.0 | 0.0 | 0.0 | 750 | 17 | 2 | 1.2 | 94 | 100 |
| Ex. 22 | X22 | 12.5 | 56.3 | 0.0 | 0.0 | 15.6 | 15.6 | 0.0 | 0.0 | 0.0 | 0.0 | 0.0 | 0.0 | 0.0 | 0.0 | 0.0 | 763 | 16 | 2 | 1.2 | 92 | 100 |
| Ex. 23 | X23 | 4.9 | 62.6 | 0.0 | 0.0 | 16.3 | 16.3 | 0.0 | 0.0 | 0.0 | 0.0 | 0.0 | 0.0 | 0.0 | 0.0 | 0.0 | 770 | 15 | 2 | 1.2 | 90 | 100 |
| Ex. 24 | X24 | 43.1 | 30.7 | 0.0 | 0.0 | 26.1 | 0.0 | 0.0 | 0.0 | 0.0 | 0.0 | 0.0 | 0.0 | 0.0 | 0.0 | 0.0 | 658 | 35 | 2 | 1.2 | 93 | 100 |
| Com. Ex. 6 | Y6 | 66.7 | 33.3 | 0.0 | 0.0 | 0.0 | 0.0 | 0.0 | 0.0 | 0.0 | 0.0 | 0.0 | 0.0 | 0.0 | 0.0 | 0.0 | 481 | 50 | 2 | 1.2 | 82 | 100 |
| Com. Ex. 7 | Y7 | 49.6 | 35.3 | 15.0 | 0.0 | 0.0 | 0.0 | 0.0 | 0.0 | 0.0 | 0.0 | 0.0 | 0.0 | 0.0 | 0.0 | 0.0 | 600 | 40 | 2 | 1.2 | 75 | 100 |

In the batteries X1 to X7, in which a carbon material was present inside the composite particles, and the area ratio of the carbon material occupying a cross section of the composite particles was 0.008 to 6%, the first charge capacity (initial capacity) was 92 or more, and the cycle retention ratio was 85 or more.

In the battery Y1, in which no carbon material was present inside the composite particles, and the batteries Y2 and Y3, in which the area ratio of the carbon material occupying a cross section of the composite particles was less than 0.008%, particle cracks occurred in association with repeated charge and discharge, resulted in deterioration in the charge-discharge cycle characteristics. In the batteries Y4 and Y5, in which the area ratio of the carbon material occupying a cross section of the composite particles exceeded 6%, the amount of silicon particles present inside the composite particles was reduced, resulted in a low initial capacity.

In the batteries of X8 to X24, too, in which the amount of each element in the lithium silicate was 3 to 55 mol % for Li, 25 mol % for Si, and 3 to 50 mol % for M, the first charge capacity (initial capacity) was 92 or more, and the cycle retention ratio was 85 or more.

In the batteries of Y6 and Y7, in which the amount of each element in the lithium silicate was outside the range of 3 to 55 mol % for Li, 25 mol % for Si, and 3 to 50 mol % for M, due to the low Vickers hardness of the lithium silicate phase, it became difficult to follow the expansion and contraction of Si that occurred in association with repeated charge and discharge, resulting in deterioration in the charge-discharge cycle characteristics.

INDUSTRIAL APPLICABILITY

The present invention can provide a non-aqueous electrolyte secondary battery having a high capacity and excellent charge-discharge cycle characteristics. The non-aqueous electrolyte secondary battery of the present invention is useful as a main power source for mobile communication devices, portable electronic devices, and other similar devices.

REFERENCE SIGNS LIST

4: frame body
5: sealing plate
6: battery case
9: electrode group
11: negative electrode lead
13: negative electrode terminal
14: positive electrode lead
20: LSX particle
21: lithium silicate phase
22: silicon particle
23: base particle
24: primary particle
25: carbon material
26: conductive layer

The invention claimed is:

1. A negative electrode active material for non-aqueous electrolyte secondary batteries, comprising:
   lithium silicate composite particles including a lithium silicate phase and silicon particles dispersed in the lithium silicate phase,
   the lithium silicate phase being an oxide phase including Li, Si, O, and M, where
   M is an element other than the following elements: Group 1 elements of alkali metals, Group 16 elements of oxygen group, Group 18 elements of rare gas, and Si, wherein
   an amount of each element relative to a total amount of Li, Si and M in the lithium silicate phase is 3 mol % to 55 mol % for Li, 25 mol % or more for Si, and 3 mol % to 50 mol % for M;
   a carbon material is present inside the lithium silicate composite particles;
   an area ratio of the carbon material measured within an entire area excluding a peripheral region of 1 μm thick from a peripheral edge of a cross section of the lithium silicate composite particles is 0.008% to 6%, wherein the area ratio is an average of measurements of ten lithium silicate composite particles having a maximum diameter of 5 μm or more included in a cross-sectional image of an active material mixture layer containing the negative electrode active material;
   the lithium silicate composite particles include an aggregate of a plurality of primary particles, the primary particles including the lithium silicate phase and the silicon particles;
   the aggregate comprises a sintered body of the primary particles defining a linear continuous interface between said primary particles; and
   the carbon material is present at at least part of the interface between the primary particles adjacent to each other, inside the lithium silicate composite particles.

2. The negative electrode active material for non-aqueous electrolyte secondary batteries of claim 1, wherein a ratio of Li to Si in the lithium silicate phase satisfies 0<Li/Si<1 in terms of a molar ratio.

3. The negative electrode active material for non-aqueous electrolyte secondary batteries of claim 1, wherein the M is at least one element selected from the group consisting of Ca, Mg, B, Al, Zr, Nb, Ta, La, V, Y, Ti, P, and W.

4. The negative electrode active material for non-aqueous electrolyte secondary batteries of claim 1, wherein an area ratio of the carbon material occupying the cross section of the lithium silicate composite particles is 1% to 5%.

5. The negative electrode active material for non-aqueous electrolyte secondary batteries of claim 1, wherein the carbon material includes at least one selected from the group consisting of a carbon compound and a carbonaceous material.

6. The negative electrode active material for non-aqueous electrolyte secondary batteries of claim 1, wherein
   the carbon material is present also inside the lithium silicate phase, and between the lithium silicate phase and the silicon particles, inside the lithium silicate composite particles, and
   the carbon material is chemically bonded to, and localized on, surfaces of the primary particles, so as to linearly extend in a network configuration along the surfaces of the primary particles.

7. The negative electrode active material for non-aqueous electrolyte secondary batteries of claim 1, further comprising an electrically conductive material covering at least part of a surface of the lithium silicate composite particles, wherein
   the carbon material is present so as to extend linearly on the cross section, from an interior toward the surface of the lithium silicate composite particles, along the interface between the primary particles adjacent to each other, and an end of the carbon material on the surface side of the lithium silicate composite particles is in contact with the conductive material.

8. A negative electrode for non-aqueous electrolyte secondary batteries, comprising:
a current collector, and a negative electrode active material layer supported on the current collector,
the negative electrode active material layer containing the lithium silicate composite particles of claim 1, and a binder.

9. The negative electrode active material for non-aqueous electrolyte secondary batteries of claim 1, wherein the M is at least one element selected from the group consisting of B, Ta, La, Y and P.

10. The negative electrode active material for non-aqueous electrolyte secondary batteries of claim 9, wherein the M further includes at least one of Ca, Mg, Al, Zr, Nb, V, T and W.

11. A negative electrode active material for non-aqueous electrolyte secondary batteries, comprising:
lithium silicate composite particles including a lithium silicate phase and silicon particles dispersed in the lithium silicate phase,
the lithium silicate phase being an oxide phase including Li, Si, O, and M, where M is an element other than the following elements: Group 1 elements of alkali metals, Group 16 elements of oxygen group, Group 18 elements of rare gas, and Si, wherein
an amount of each element relative to a total amount of Li, Si and M in the lithium silicate phase is 3 mol % to 55 mol % for Li, 25 mol % or more for Si, and 3 mol % to 50 mol % for M;
a carbon material is present inside the lithium silicate composite particles;
an area ratio of the carbon material measured within an entire area excluding a peripheral region of 1 μm thick from a peripheral edge of a cross section of the lithium silicate composite particles is 0.008% to 6%, wherein the area ratio is an average of measurements of ten lithium silicate composite particles having a maximum diameter of 5 μm or more included in a cross-sectional image of an active material mixture layer containing the negative electrode active material; and
the M is at least one element selected from the group consisting of B, Ta, La, Y and P.

12. The negative electrode active material for non-aqueous electrolyte secondary batteries of claim 11, wherein the M further includes at least one of Ca, Mg, Al, Zr, Nb, V, T and W.

* * * * *